United States Patent
Simpson

(10) Patent No.: US 9,228,668 B2
(45) Date of Patent: Jan. 5, 2016

(54) OVERPRESSURE RELIEF VALVE ASSEMBLY

(75) Inventor: Scott W. Simpson, Easthampton, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 797 days.

(21) Appl. No.: 13/451,000

(22) Filed: Apr. 19, 2012

(65) Prior Publication Data
US 2013/0276916 A1 Oct. 24, 2013

(51) Int. Cl.
*F16K 31/12* (2006.01)
*F16K 17/06* (2006.01)

(52) U.S. Cl.
CPC ............ *F16K 17/06* (2013.01); *Y10T 137/7837* (2015.04)

(58) Field of Classification Search
CPC .......................... F16K 17/06; Y10T 137/7837
USPC ............. 137/454.2, 454.5, 515, 515.3, 515.5, 137/530, 536, 539, 539.5, 540, 543.23
See application file for complete search history.

(56) References Cited

U.S. PATENT DOCUMENTS

| | | | |
|---|---|---|---|
| 543,773 A * | 7/1895 | Massey | 137/539.5 |
| 1,120,713 A * | 12/1914 | Hennesy | 137/515.3 |
| 1,574,537 A * | 2/1926 | Burch | 137/515.3 |
| 2,148,327 A * | 2/1939 | Smith et al. | 137/515.3 |
| 2,322,139 A * | 6/1943 | Kaelin | 137/515.3 |
| 3,808,798 A * | 5/1974 | Taylor | 137/513.5 |
| 5,117,633 A * | 6/1992 | Bayer et al. | 60/431 |
| 5,183,075 A * | 2/1993 | Stein | 137/539 |
| 6,026,847 A * | 2/2000 | Reinicke et al. | 137/487.5 |
| 6,257,268 B1 * | 7/2001 | Hope et al. | 137/112 |

FOREIGN PATENT DOCUMENTS

| | | |
|---|---|---|
| CN | 2714917 Y | 8/2005 |
| CN | 101162064 A | 4/2008 |
| CN | 201875225 U | 6/2011 |

OTHER PUBLICATIONS

English translation of CN Office Action for Application No. 201310209144.3, Issued Mar. 12, 2015, 10 Pages.
English translation of CN Search Report for Application No. 201310209144.3, Issued Dec. 17, 2014, 3 Pages.

* cited by examiner

*Primary Examiner* — Kevin Lee
*Assistant Examiner* — Phyllis Macade Nichols
(74) *Attorney, Agent, or Firm* — Cantor Colburn LLP

(57) ABSTRACT

An overpressure relief valve assembly includes an outer housing having an inlet at a first end opening to an inlet cavity and an outlet at an opposite second end opening to an outlet cavity, and a valve located in the outer housing, the valve including a valve housing that is fixed with respect to the outer housing and an actuator movable within the valve housing to alternatingly cut off and allow communication between the inlet cavity and the outlet cavity.

4 Claims, 3 Drawing Sheets

OVERPRESSURE RELIEF VALVE ASSEMBLY

BACKGROUND OF THE INVENTION

Exemplary embodiments pertain to the art of fluid propagation systems and, in particular, to an overpressure relief valve to prevent over-pressure in a line of a fluid propagation system.

The flow of fluid in lines of a fluid propagation system is turned on and off by valves. In some systems, such as in coolant systems configured to supply coolant to a galley of an aircraft, one valve may control the flow of fluid to a first destination and a second valve may control the flow of fluid along a line that bypasses the first destination. In some systems, if all of the valves designed to provide destinations of a fluid are closed or blocked, a buildup of pressure in the system may create problems, such as leaks or pump surge.

BRIEF DESCRIPTION OF THE INVENTION

Disclosed is a overpressure relief valve assembly comprising an outer housing having an inlet at a first end opening to an inlet cavity and an outlet at an opposite end opening to an outlet cavity and a valve located in the outer housing, the valve including a valve housing that is fixed with respect to the outer housing and an actuator movable within the valve housing to alternatingly cut off and allow communication between the inlet cavity and the outlet cavity. The valve may include a spring to bias the actuator towards the inlet cavity, and the valve housing may include holes between an inside of the valve housing and an outside of the valve housing, and the actuator may be movable within the valve housing to alternatingly expose the holes to be in communication with the inlet cavity and to cut off the holes from communication with the inlet cavity.

Also disclosed is a overpressure relief valve assembly comprising an outer housing having an inlet portion including an inlet rim opening to an inlet cavity from outside the outer housing and an inlet portion mounting base, and an outlet portion including an outlet rim opening to an outlet cavity from outside the outer housing and including an outlet portion mounting base mounted to the inlet portion mounting base, a nozzle mounted within the inlet portion and having a nozzle cavity in communication with the inlet cavity; and a valve mounted to the nozzle and located in the outer housing, the valve including a valve housing that is fixed with respect to the outer housing and an actuator movable within the valve housing to alternatingly cut off and allow communication between the nozzle cavity and the outlet cavity.

Also disclosed is a system comprising a coolant source, a refrigeration unit connected to the coolant source by a first line, a secondary coolant destination connected to the coolant source by a second line extending from a first junction with the first line, a first valve located along the first line at a point downstream from the first junction and configured to selectively permit and prevent coolant from flowing from the coolant source to the refrigeration unit, a second valve located along the second line between the first junction and the secondary coolant destination to selectively permit and prevent coolant from flowing from the coolant source to the secondary coolant destination, and a overpressure relief valve assembly located on a third line extending from a second junction on the first line upstream from the first junction.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of example and not limitation with reference to the Figures.

Figure 1:
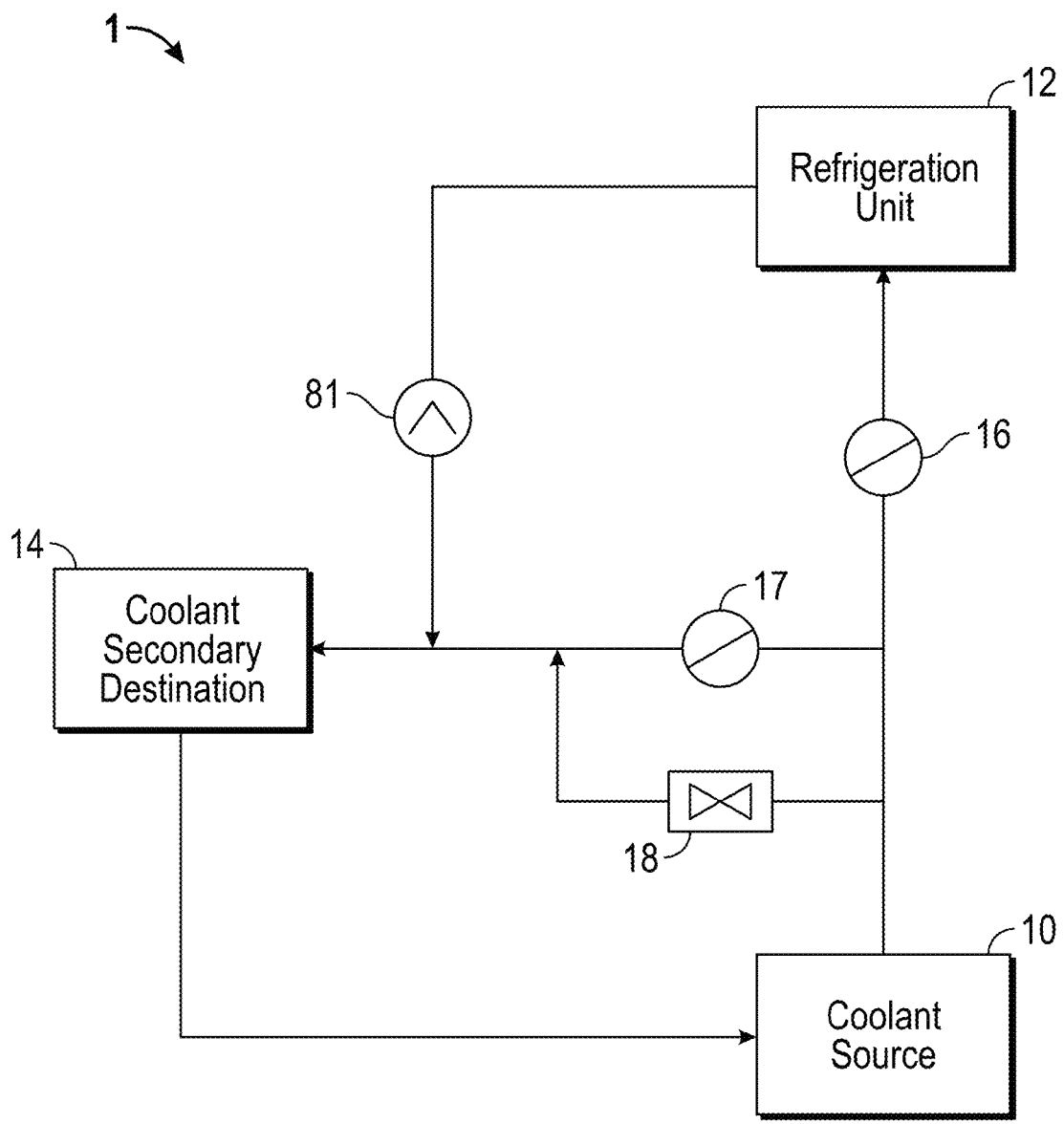
FIG. 1 is a diagram of a cooling system according to one embodiment.

FIG. 1 illustrates a cooling system 1 according to embodiments of the invention. The cooling system 1 includes a coolant source 10, a refrigeration unit 12, and a coolant secondary destination 14. Examples of a coolant source 10 include storage containers to store a fluid coolant, such as Freon or carbon dioxide. The fluid coolant is transmitted via pipes, tubes, or lines to the refrigeration unit 12 and the coolant secondary destination 14. Examples of refrigeration units 12 include refrigerators having heat exchangers, a compressor, and an expansion valve in order to refrigerate food or other perishable materials stored therein, or a system to cool mechanical or electrical components. In one embodiment, the refrigeration unit 12 is part of a galley of an aircraft and is used to store food for passengers. Examples of a coolant secondary destination 14 include a coolant recycling system, heat exchangers, a storage unit to store used coolant, secondary refrigeration units, etc.

The system 1 also includes one or more valves that are opened or closed to direct the coolant to a desired location. In the illustrated embodiment, the system 1 includes a first valve 16 coupled between the coolant source 10 and the refrigeration unit 12 and second valve 17 coupled between the coolant source 10 and the coolant secondary destination 14. During operation, when a coolant is to be supplied to the refrigeration unit 12, the first valve 16 is open and the second valve 17 is closed. In such a configuration, the coolant flows from the coolant source 10 to the refrigeration unit 12. When coolant is to be supplied to the coolant secondary destination 14 to bypass the refrigeration unit 12, the first valve 16 is closed and the second valve 17 is opened, and the coolant flows from the coolant source 10 to the coolant secondary destination 14. In some embodiments, the coolant may be supplied simultaneously to the refrigeration unit 12 and the coolant secondary destination 14 by opening both the first valve 16 and the second valve 17.

The first and second valves 16 and 17 may be mechanically controlled or electrically controlled. The first and second valves 16 and 17 may include physical handles to be manipulated by a user to open or close the valves. Alternatively, the first and second valves 16 and 17 may include hydraulic levers that are controlled by applying hydraulic pressure from a hydraulic control system that does not include the coolant to open and close the first and second valves 16 and 17. In an alternative embodiment, the first and second valves 16 and 17 are controlled by electrical circuits receiving electrical signals to open and close the valves. For example, an actuator may be connected to one or more coils controlled by electrical signals to move the actuator to open and close the first and second valves 16 and 17.

During normal operation, one of the first and second valves 16 and 17 is opened to provide an outlet for coolant and to alleviate a pressure build-up of the coolant. However, an overpressure relief valve 18 is connected to bypass the second valve 17. For example, the overpressure relief valve 18 may be connected in parallel with the second valve 17. In the event that both of the first and second valves 16 and 17 are closed or otherwise blocked, the overpressure relief valve 18 provides an outlet for coolant from the coolant source 10 to flow to the coolant secondary destination 14. In another embodiment, the overpressure relief valve 18 is connected to a secondary destination separate from the coolant secondary destination 14. A check valve 81 prevents the flow from reversing though the refrigeration unit 12.

Figure 2:
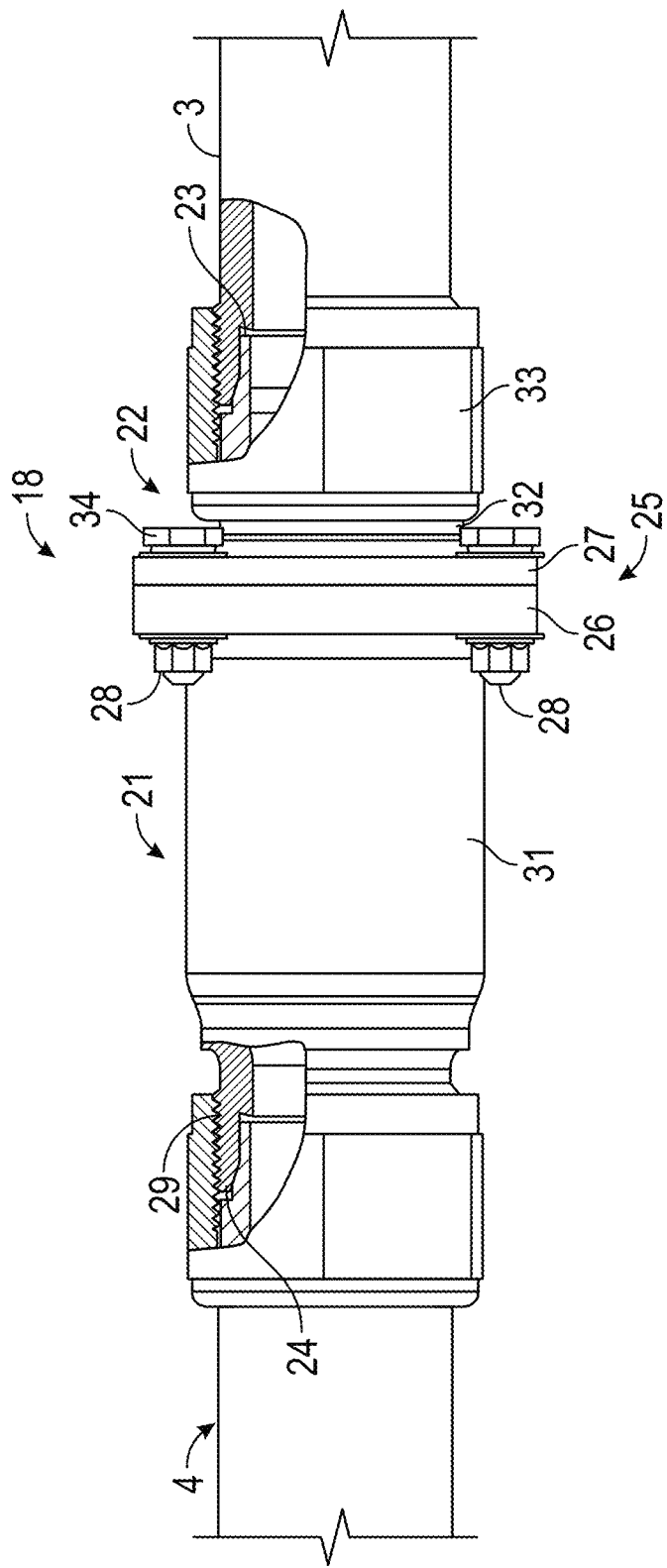
FIG. 2 is a side view of a overpressure relief valve according to an embodiment of the invention.

FIG. 2 illustrates a side view of an overpressure relief valve 18 according to an embodiment of the invention. The overpressure relief valve 18 includes an inlet portion 22 connected to a first hose, pipe, or line 3 and an outlet portion 21 connected to a second hose, pipe, or line 4. The inlet portion 22 includes an inlet rim 23 inserted into the first line 3 and a nut 33 surrounding an end of the first line 3, so that the first line 3 is positioned between the inlet rim 23 and the nut 33 when inserted into the inlet portion 22 of the overpressure relief valve 18. The inlet portion 22 further includes an inlet housing 32 of which the inlet rim 23 is a part, and to which the nut 33 is connected. In one embodiment, the nut 33 is rotatably mounted to the inlet housing 32.

The outlet portion 21 includes an outlet rim 24 and a threaded portion 29. The second line 4 may be mounted to the outlet portion 21 by being screwed onto the threaded portion 29. The outlet portion 21 further includes an outlet housing 31. The overpressure relief valve 18 includes a connection portion 25 to connect the inlet portion 22 and the outlet portion 21. The connection portion 25 includes a mounting base 26 of the outlet portion 21 and a mounting base 27 of the inlet portion 22. The mounting bases 26 and 27 protrude in a radial direction from a center length axis of the inlet portion 22 to the outlet portion 21. The mounting bases 26 and 27 may be connected by nuts 28 and bolts 34, or by any other mounting means, including screws, brads, brackets, welds, adhesives, or any other means.

Although FIG. 2 illustrates a nut 33 at one end and a threaded portion 29 at the other end, it is understood that the overpressure relief valve 18 may include a nut 33 at each end, a threaded portion 29 at each end without a nut 33, or the nut 33 may be located on the outlet portion 21 and the threaded portion 29 may be located on the inlet portion 22.

Figure 3:
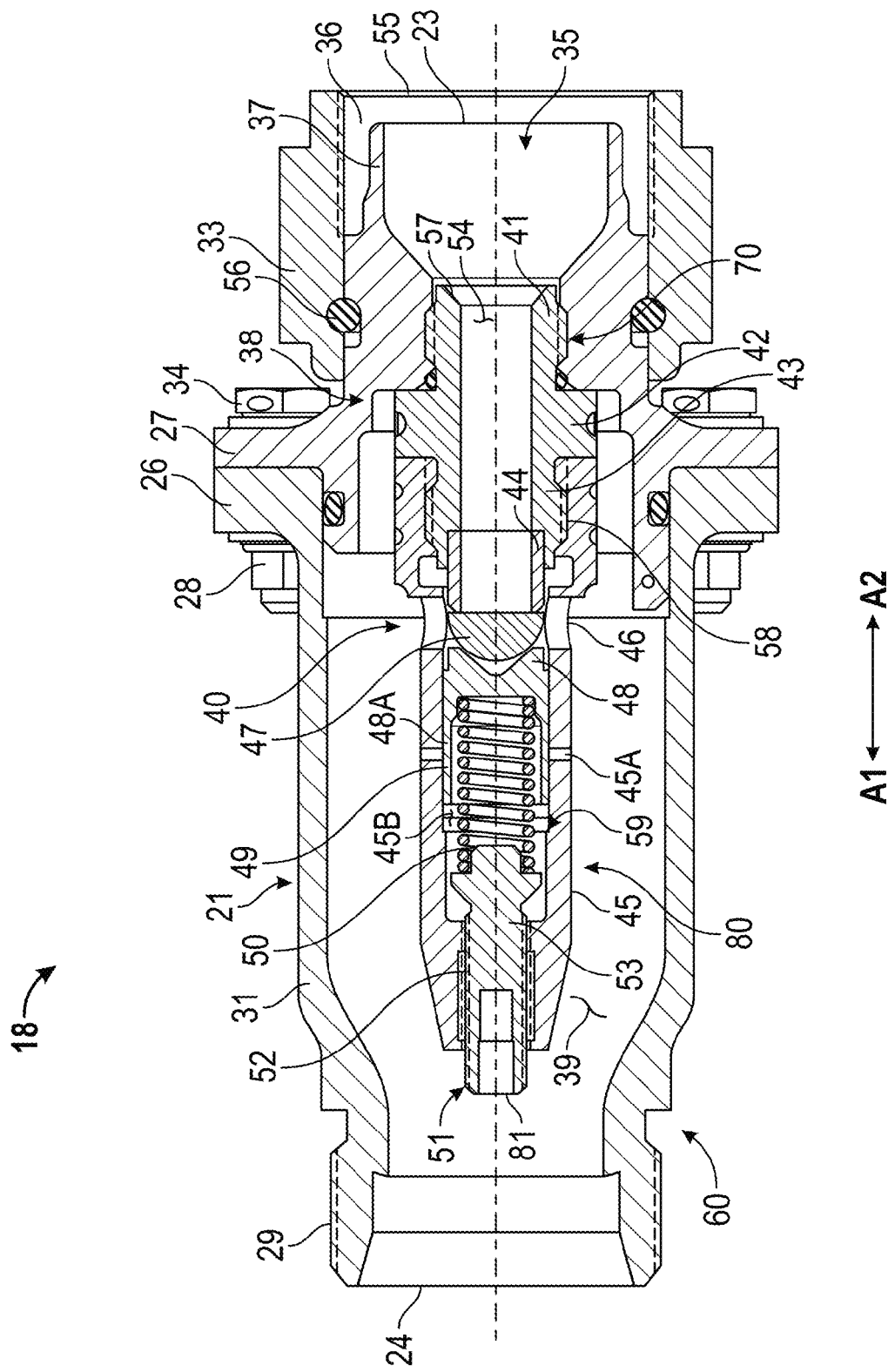
FIG. 3 is a cross-sectional view of an overpressure relief valve according to an embodiment of the invention.

FIG. 3 illustrates a cross-section of the overpressure relief valve 18 according to an embodiment of the invention. The overpressure relief valve 18 includes an outer housing 60, a nozzle 70 located within the outer housing 60, and a valve 80 located downstream from the nozzle 70, where the inlet portion 22 is defined as an upstream end of the overpressure relief valve 18, or an end from which a fluid enters the overpressure relief valve 18. In the legend of FIG. 3, the direction A1 represents a downstream direction, and the direction A2 represents an upstream direction. That is, an element is downstream of another element if it is located in the direction A1 from the other element and vice versa.

The inlet portion 22 of the outer housing 60 includes an inlet housing 32 having a mounting base 27, a main body 38, inlet cavity walls 37 to define an inlet cavity 35, and an inlet rim 23. The inlet portion 22 further includes a nut 33 connected to the main body 38. In one embodiment, a ring or wire 56 is positioned between the nut 33 and the main body 38 to hold the nut 33 in place, and to permit the nut 33 to be rotated with respect to the main body 38. The nut 33 includes a rim 55 and a threaded portion 36. The nut 33 may be rotatable around the main body 38 to screw the threaded portion 36 onto a matching threaded portion of a hose, pipe, or line, for example.

The outlet portion 21 includes an outlet housing 31 including an outlet rim 24, an outlet threaded portion 29 adjacent to the rim 24, and an outlet housing mounting base 26 at an opposite end of the outlet housing 31 from the outlet rim 24. The outlet housing 31 defines an outlet cavity 39. During operation, a fluid may flow from the nozzle 70 through the outlet cavity 39 and out the outlet rim 24.

The nozzle 70 is located within the outer housing 60 and includes an inlet 57 open to the inlet cavity 35 of the inlet housing 32. The inlet 57 of the nozzle may have a diameter smaller than a diameter of the inlet rim 23 of the inlet housing 32. The nozzle 70 further includes a first threaded portion 41 adjacent to the inlet 57, a nozzle mounting ring 42, and a second threaded portion 43 on an opposite side of the nozzle mounting ring 42 from the first threaded portion 41. The nozzle mounting ring 42 may have an outer diameter greater than the outer diameters of the first and second threaded portions 41 and 43, and may be positioned in an axial direction A between the valve housing 45 and the inlet main body 38 of the inlet housing 32. An inside surface of the nozzle 70 defines a nozzle cavity 54 in communication with the inlet cavity 35.

The first and second threaded portions 42 and 43 may be threaded on an outside surface to interact with threaded inner surfaces of the inlet main body 38 and the valve housing 45. As a result, the inlet housing 32, the nozzle 70, and the valve 80 are firmly fixed with respect to each other. While threads are illustrated as a mechanism for connecting the inlet housing 32, the nozzle 70, and the valve 80, any appropriate fixing mechanism may be used, such as latches, adhesives, ribs or ridges, grooves, or any other fixing means.

The nozzle 70 further includes a half-ball seat portion 44 against which a half-ball poppet 47 is pressed by a spring 50 at its flat end. The half-ball seat portion 44 may be a separate piece from the rest of the nozzle 70 that is mounted within the rest of the nozzle 70, or the nozzle 70 including the half-ball seat portion 44 may be manufactured as one integral piece.

The valve 80 includes a housing 45 including a threaded opening 52 at one end to receive a screw 51 and a threaded portion 58 at an opposite end to engage the second threaded portion 43 of the nozzle 70. A portion of the nozzle 70 including the half-ball seat portion 44 is located within the threaded portion 58 of the valve housing 45. A spring 50 is connected to a screw spring mount 53 and the poppet guide 48, such that screwing the screw 51 in a direction A2 toward the inlet portion 22 compresses the spring 50 between the spring mount 53 and the poppet guide 48, increasing a pressure applied to the poppet guide 48. The poppet guide 48 may include walls 49 defining a receptacle to surround the spring 50. The head 81 of the screw 51 may face the first direction A1, such that a screwdriver, hex key or Allen wrench, or other tool inserted into the outlet rim 24 adjusts a position of the screw 51 in the valve housing 45. Although FIG. 3 illustrates the screw 51 having a mounting portion 53 to be inserted into a spring 50 and the poppet guide 48 having walls 49 to surround the spring 50, it is understood that the screw 51 may have a mounting portion 53 and/or walls, and the poppet guide 48 may have a mounting portion 53 and/or walls 49.

The poppet guide 48 includes a conical portion defining a receptacle to engage a curved portion of the half-ball poppet 47. The valve 80 includes one or more holes 40 defined by walls 46 that are part of the valve housing 45. In operation, when a pressure differential between a fluid in the nozzle cavity 54 and the outlet cavity 39 results in a higher pressure in the nozzle cavity 54 than in the outlet cavity 39, the half-ball poppet 47 is pressed against the spring 50. When the pressure against the half-ball poppet 47 in a first direction A1 is greater than a force exerted by the spring 50 in a second direction A2 opposite the first direction A1, the half-ball poppet 47 moves in the first direction A1, exposing the holes 40. Consequently, a fluid in the nozzle cavity 54 is expelled into the outlet cavity 39 and out of the outlet rim 24.

The housing 45 may contain one or more poppet guide 48 pressure balance holes 45A. These holes allow fluid to enter the poppet guide cavity 45B. The poppet guide walls 49 may include an annulus 48A. The pressure balance holes 45A may align with the annulus within the stroke of the poppet guide.

The valve 80 may include a ridge 59 located on an inside surface of the valve 80 in the first direction A1 from the holes 40. The ridge 59 may stop the movement of the half-ball poppet 47 in the first direction A1. The ridge 59 may be, for example, a ring on the inside surface of the valve housing 45.

While a half-ball poppet 47 is illustrated in FIG. 3 as a valve mechanism, it is understood that the valve mechanism may be any actuator having any shape capable of being moved in the directions A1 and A2 according to a fluid pressure in the overpressure relief valve 18. Other example shapes of a valve mechanism include a cylinder shape, a cone shape, a spherical shape, or any other desired shape.

In the above-described embodiments, an overpressure relief valve 18 includes an outer housing 31 and 32 that is connected to fluid lines, and a valve 80 within the outer housing that allows for the passage of a fluid when a pressure differential within the overpressure relief valve 18 reaches a predetermined level. The predetermined pressure level may be adjusted by a screw 51 which may adjust a compression of a spring 50. The spring 50 may press against a valve mechanism, such as a poppet guide 48 and half-ball poppet 47 to maintain the valve in a closed position when a pressure is below a threshold, and which opens the valve 80 when the pressure is equal to or above the threshold.

Embodiments of the present invention encompass any environment in which a fluid is provided from a source to a destination. One such environment is an environment in which a coolant or refrigerant is supplied to a galley of an aircraft, such as a passenger airplane. A coolant source may include a refrigerant source, the refrigeration unit may include one or more food storage areas, and the secondary coolant destination may include a coolant recycling area, a coolant storage unit, or another system utilizing the coolant.

In embodiments of the invention, the valve 80 is mounted to a nozzle 70, which is mounted to an inlet housing 32. An outlet housing 31 may also be mounted to the inlet housing 32, so that in one embodiment the outlet housing 31 is not directly connected to the valve 80, but rather both the valve 80 and the outlet housing 31 are mounted to the inlet housing 32.

In embodiments of the invention, the overpressure relief valve 18 is opened only by a pressure differential in a first direction A1. In other words, only an increase in pressure in the inlet portion 22 relative to the outlet portion 21 causes the valve 80 to be opened, and the valve 80 is not opened as a result of an increase in pressure in the outlet portion 21 relative to the inlet portion 22.

In one embodiment of the present invention, the overpressure relief valve 18 comprises dimensions and materials to accommodate a fluid flow of 6.8 gallons per minute (gpm) at −40 degrees Fahrenheit and 13 gpm at 30 degrees Fahrenheit. For example, the inlet housing 32 and the outlet housing 31 may be made of aluminum, such as 6061-T6, T6510, or T6511 grade aluminum. The nozzle 70 and half-ball seat 44 may be made of stainless steel, such as 440C grade stainless steel. The valve housing 45 and poppet guide 48 may be made of a metal alloy, such as NITRONIC 60, which is defined as an alloy comprising at most 0.10% carbon, between 7 and 9% manganese, between 3.5 and 4.5% silicon, between 16 and 18% chromium, between 8 and 9% nickel, between 0.08 and 0.18% nitrogen, and any remaining percent being iron. The half-ball poppet 47 may be made of stainless steel, such as 440C grade stainless steel. The screw 51 may be made of stainless steel, such as A286 grade stainless steel.

In one embodiment, a ratio of a length of the overpressure relief valve 18 from the inlet rim 23 to the outlet rim 24 is between 1:1.5 and 1:2, such as 1:1.75. In one embedment, the inlet threaded portion 36 has a same inner diameter as an outer diameter of the outlet threaded portion 29. In one embodiment, a ratio of a length of the valve 80 to a combined length of the inlet housing 32 and the outlet housing 31 is between 1:2 and 1:2.5, such as 1:2.25. In one embodiment, a ratio of a length of the nozzle 70 to the combined length of the inlet housing 32 and the outlet housing 31 is between 1:3.30 and 1:3.80, such as 1:3.55.

In one embodiment, a ratio of a diameter of the nozzle cavity 54 to a diameter of the inlet cavity 35 at its widest point is between 1:2.75 and 1:3.25, such as 1:30. In one embodiment, a ratio of a diameter of the inlet cavity 35 at its widest point to a diameter of the outlet cavity 39 at its widest point is between 1:1.3 and 1:1.8, such as 1:1.55. In one embodiment, a ratio of a diameter of the holes 40 to a diameter of the nozzle cavity 54 is between 1:1.26 and 1:1.32, such as 1:1.29.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An overpressure relief valve assembly, comprising:
    an outer housing having each of an inlet portion including an inlet rim and an inlet portion mounting base, an outlet portion including an outlet rim and an outlet portion mounting base, the inlet rim opening to an inlet cavity from outside the outer housing, the outlet rim opening to an outlet cavity from outside the outer housing, and the outlet portion mounting base mounted to the inlet portion mounting base;
    a nozzle mounted within the inlet portion and having a nozzle cavity in communication with the inlet cavity; and
    a valve mounted to the nozzle and located in the outer housing, the valve including a valve housing and that is fixed with respect to the outer housing and an actuator movable within the valve housing to alternatingly cut off and allow communication between the nozzle cavity and the outlet cavity;
    wherein the nozzle includes a first threaded portion engaged with a threaded portion of the inlet portion of the outer housing and a second threaded portion engaged with a threaded portion of the valve;
    wherein the nozzle further comprising a ring extending radially outward from between the first and second threaded portions, the ring being positioned in an inlet-to-outlet radial direction between an inlet housing of the inlet portion and the threaded portion of the valve.

2. The overpressure relief valve assembly of claim 1, wherein the valve further comprises:
    a spring to bias the actuator in a direction of the inlet rim; and a screw that is mounted to the valve housing and rotatable with respect to the valve housing to adjust a bias of the spring in the direction of the inlet rim.

3. The overpressure relief valve assembly of claim 2, wherein a head of the screw faces the outlet rim.

4. The overpressure relief valve assembly of claim 1, wherein the valve housing is spaced apart from the outlet portion of the outer housing.

\* \* \* \* \*